United States Patent
Lee et al.

(10) Patent No.: US 7,846,981 B2
(45) Date of Patent: Dec. 7, 2010

(54) POLYMER ELECTROLYTIC MEMBRANE, AND FUEL CELL EMPLOYING THE SAME

(75) Inventors: Won-mok Lee, Seoul (KR); Hae-kyoung Kim, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1225 days.

(21) Appl. No.: 11/443,176

(22) Filed: May 31, 2006

(65) Prior Publication Data
US 2007/0154763 A1    Jul. 5, 2007

(30) Foreign Application Priority Data
Dec. 30, 2005    (KR)  .................. 10-2005-0135841

(51) Int. Cl.
*C08J 5/22*    (2006.01)
(52) U.S. Cl. .................... 521/27; 528/25; 528/391; 429/33
(58) Field of Classification Search .......... 521/25, 521/27; 429/12, 30, 33; 528/25, 319
See application file for complete search history.

(56) References Cited
FOREIGN PATENT DOCUMENTS

| CN | 1385459 | 12/2002 |
|---|---|---|
| JP | 2001-151834 | 6/2001 |
| JP | 2002-164055 | 6/2002 |
| JP | 2005-228671 | 8/2005 |
| JP | 2005-339991 | 12/2005 |

OTHER PUBLICATIONS

Machine translation of JP 2005-228671 A. (Aug. 25, 2005).*
English translation of CN 1385459 A. (Dec. 18, 2002).*
Office Action issued in corresponding Japanese Patent Application No. 2006-149869 dated Nov. 4, 2008.
Office Action issued in corresponding Chinese Patent Application No. 2006100876567 dated Jan. 16, 2009.
Chinese Office Action dated Mar. 30, 2010, issued in corresponding Chinese Patent Application No. 2006100876567.

* cited by examiner

*Primary Examiner*—David Wu
*Assistant Examiner*—Vu A Nguyen
(74) *Attorney, Agent, or Firm*—Lee & Morse, P.C.

(57) ABSTRACT

A proton conductive copolymer includes styrene repeating units that have proton conductive functional groups and dimethylsiloxane repeating units. A polymer electrolyte membrane includes the proton conductive copolymer and a fuel cell uses the polymer electrolyte membrane. The proton conductive copolymer has excellent chemical and mechanical properties, excellent ability to form membrane with dimethylsiloxane repeating units, and superior ion conductivity with styrene repeating units that have proton conductive functional groups. Polymer electrolyte membranes that have properties appropriate for the fuel cell electrolyte membrane can be obtained using the proton conductive copolymer. Fuel cells that have improved efficiencies can be obtained using the polymer electrolyte membrane.

18 Claims, 5 Drawing Sheets

POLYMER ELECTROLYTIC MEMBRANE, AND FUEL CELL EMPLOYING THE SAME

CROSS-REFERENCE TO RELATED APPLICATION

This application claims the benefit of Korean Patent Application No. 2005-135841, filed on Dec. 30, 2005, in the Korean Intellectual Property Office, the disclosure of which is incorporated herein in its entirety by reference.

BACKGROUND OF THE INVENTION

1. Field of the Invention

Aspects of the present invention relate to a polymer electrolytic membrane, and a fuel cell employing the same, and more particularly, to a polymer electrolytic membrane having excellent ion conductivity, chemical and mechanical stabilities and a fuel cell employing the same.

2. Description of the Related Art

Fuel cells may be classified according to their electrolyte type. Types of fuel cells include polymer electrolyte membrane fuel cells (PEMFC), phosphoric acid fuel cells (PAFC), molten carbonate fuel cells (MCFC), solid oxide fuel cells (SOFC) and others. The working temperatures of fuel cells and their constituent materials vary depending on the electrolyte type.

According to the method of supplying fuel to the anode, fuel cells can be classified into external reforming type fuel cells, in which fuel is converted into hydrogen enrichment gas by a fuel reformer and supplied to the anode, and internal reforming type fuel cells, in which fuel in a liquid or gaseous state is directly supplied to the anode.

A representative example of a direct fuel supply type fuel cell is a direct methanol fuel cell (DMFC). In the DMFC, an aqueous methanol solution is used as fuel, and a proton conductive polymer electrolyte membrane is used as an electrolyte. Accordingly, DMFC is a kind of PEMFC.

PEMFCs are small and lightweight but can achieve a high output density. Furthermore, a power generation system can be easily constituted using a PEMFC.

The basic PEMFC may include an anode (fuel electrode), a cathode (oxidizing agent electrode), and a polymer electrolyte membrane interposed between the anode and the cathode. The anode may include a catalyst layer to promote the oxidation of fuel and the cathode may include a catalyst layer to promote the reduction of an oxidizing agent.

The fuel supplied to the anode may be hydrogen, a hydrogen-containing gas, a mixture of methanol vapor and water vapor, an aqueous methanol solution, or the like. The oxidizing agent supplied to the cathode may be oxygen, an oxygen-containing gas, air, or the like.

Fuel is oxidized to produce protons and electrons at the anode of the PEMFC. The protons migrate to the cathode through an electrolyte membrane, and the electrons migrate to an external circuit (load) through a conductive wire (or current collector). At the cathode of the PEMFC, the migrated protons react with the electrons and oxygen to produce water. The migration of electrons from the anode to the cathode via the external circuit generates electric power.

In a PEMFC, the polymer electrolyte membrane acts as an ionic conductor for the migration of protons from the anode to the cathode and also acts as a separator to prevent contact between the anode and the cathode. The polymer electrolyte membrane therefore requires sufficient ionic conductivity, electrochemical safety, high mechanical strength, thermal stability at its operating temperature, and should be easily formed into thin layers.

Materials for the polymer electrolyte membrane typically include a sulfonated perfluorinated polymer with fluorinated alkylene in the backbone and fluorinated vinylether side chains with sulfonic acid at its terminal. An example of a sulfonated perfluorinated polymer is NAFION, manufactured by Dupont. A polymer electrolyte membrane impregnated with an appropriate amount of water provides excellent ionic conductivity.

However, such a polymer electrolyte membrane may have insufficient methanol permeability and a high cost of manufacturing and may experience a lowered ionic conductivity at operating temperatures of 100° C. or higher due to the loss of moisture by evaporation. It is therefore difficult to operate a PEMFC using such polymer electrolyte membrane under atmospheric pressure at about 100° C. or higher. PEMFCs have been operated at 100° C. or lower, such as, for example, at about 80° C.

When an electrolyte membrane has high ion conductivity, the water permeability of the electrolyte membrane is high, and thus the methanol permeability also tends to be high. Therefore, an electrolyte membrane having high ion conductivity cannot easily have low methanol permeability. The amount of water and methanol passing through an electrolyte membrane in an aqueous methanol solution having a predetermined concentration can be measured and compared with the amount passing through a standard electrolyte membrane, such as, for example NAFION 115. When the amount of water passing through the electrolyte membrane is the same as or more than that passing through Nafion 115 and the amount of methanol is the same as or less than that passing through Nafion 115, the electrolyte membrane is considered to be suitable as an electrolyte membrane for a DMFC.

To meet these requirements, much research on polymer electrolyte membranes capable of replacing the NAFION electrolyte membrane has been carried out. Block copolymers including hydrocarbon based repeating units such as styrene repeating units, ethylene-r-butylene repeating units, and isobutylene repeating units have been known as materials for polymer electrolyte membranes.

However, such block copolymers fail to stabilize membrane and electrolyte assembly (MEA) values due to methanol crossover and swelling.

SUMMARY OF THE INVENTION

Aspects of the present invention provide a proton conductive copolymer having excellent chemical and mechanical stabilities and reduced methanol crossover, a polymer electrolyte membrane including the proton conductive copolymer having excellent ion conductivity, chemical and mechanical stabilities and a fuel cell using the polymer electrolyte membrane having improved efficiencies.

According to an aspect of the present invention, there is provided a proton conductive copolymer including repeating units represented by formulae (1), (2) and (3).

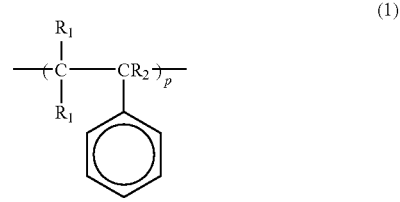

(1)

In formula (1), $R_1$ and $R_2$ are each independently one of hydrogen, a halogen atom and a $C_1$-$C_{10}$ halogenated alkyl group and p represents a mole fraction and is in the range of 0.1 to 0.9.

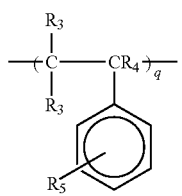

(2)

In formula (2), $R_3$ and $R_4$ are each independently one of hydrogen, a halogen atom and a $C_1$-$C_{10}$ halogenated alkyl group, $R_5$ is one of —$SO_3H$, —$PO_3H$ and $CO_2H$ and q represents a mole fraction and is in the range of 0.1 to 0.9.

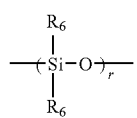

(3)

In formula (3), $R_6$ is a $C_1$-$C_{10}$ alkyl group and r represents a mole fraction and is in the range of 0.1 to 0.9 mole, and wherein p+q+r=1.

According to another aspect of the present invention, there is provided a proton conductive copolymer that is formed by sulfonating a copolymer represented by formula (5):

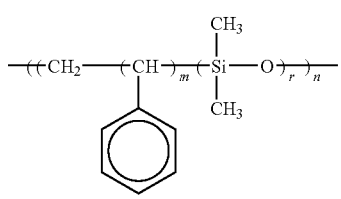

(5)

wherein m represents a mole fraction and is in the range of 0.1 to 0.9, r represents a mole fraction and is in the range of 0.1 to 0.9, wherein m+r=1 and n is in the range of 1 to 100,000.

According to another aspect of the present invention, there is provided a polymer electrolyte membrane including the proton conductive copolymer above.

According to another aspect of the present invention, there is provided a fuel cell including the polymer electrolyte membrane that contains the proton conductive copolymer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
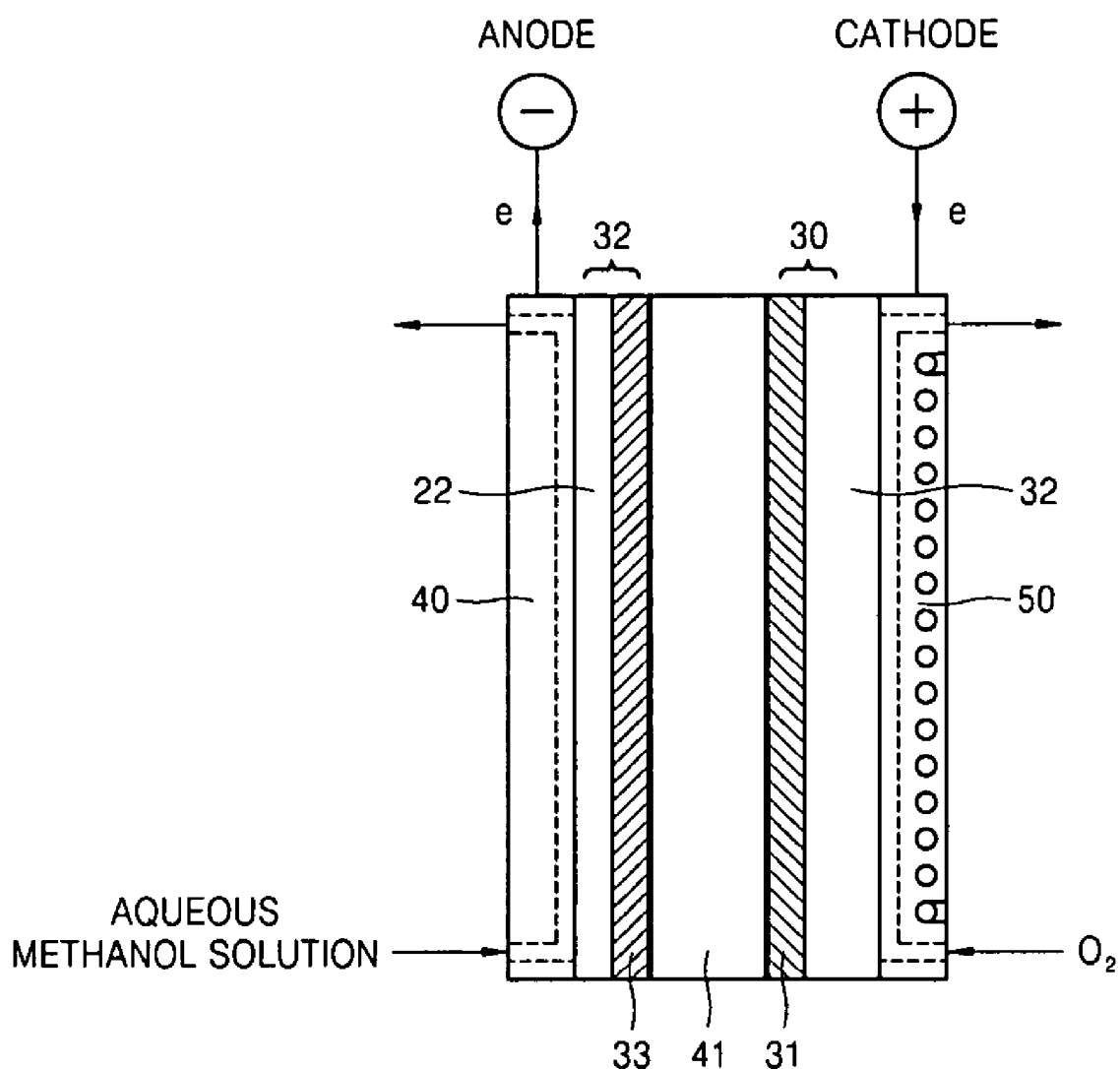
FIG. 1 illustrates the structure of a direct methanol fuel cell according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A proton conductive copolymer of an embodiment of the present invention includes three types of repeating units, which are a first styrene repeating unit represented by formula (1), a second styrene repeating unit represented by formula (2) and which has excellent ion conductivity due to the presence of a proton conductive group and a dimethylsiloxane repeating unit represented by formula (3) and which has excellent chemical and mechanical properties and provides hydrophobicity.

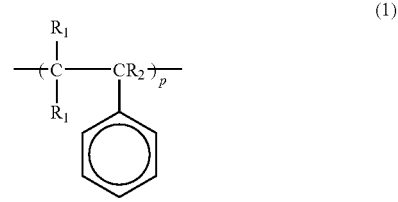

(1)

In formula (1), $R_1$ and $R_2$ are each independently one of hydrogen, a halogen atom and a $C_1$-$C_{10}$ halogenated alkyl group and p represents a mole fraction and is in the range of 0.1 to 0.9.

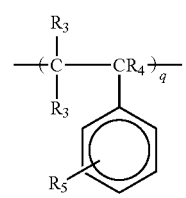

(2)

In formula (2), $R_3$ and $R_4$ are each independently one of hydrogen, a halogen atom and a $C_1$-$C_{10}$ halogenated alkyl group, $R_5$ is one of —$SO_3H$, —$PO_3H$ and $CO_2H$ and q represents a mole fraction and is in the range of 0.1 to 0.9.

(3)

In formula (3), $R_6$ is a $C_1$-$C_{10}$ alkyl group and r represents a mole fraction and is in the range of 0.1 to 0.9. In the above formulae, p+q+r=1.

The degree of polymerization with respect to each of the three types of repeating units of the proton conductive copolymer may be in the range of 1 to 100,000 and the weight average molecular weight of the proton conductive copolymer may be in the range of 500 to 5,000,000.

The copolymer may be any form of copolymer, such as random, block, etc., that contains the three types of repeating units represented by formulae (1), (2), and (3). For example, the copolymer may be a block copolymer in which the first styrene repeating unit, the second styrene repeating unit and the dimethylsiloxane repeating unit are connected to each other to form copolymers having a nano structure in various shapes and sizes according to the constituent proportions and molecular weight of the repeating units. Examples of the nano structure include cylindrical structure, stratified structure, and the like.

The proton conductive copolymer may be represented by formula (4) below.

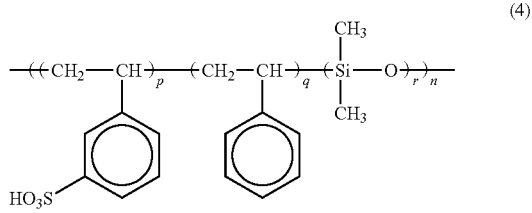

(4)

In formula (4), p, q and r each represent a mole fraction, p, q and r are each in the range of 0.1 to 0.9, p+q+r=1, and n is in the range of 1 to 100,000.

Hereinafter, a method of preparing the proton conductive copolymer according to an embodiment of the present invention will be described in detail. Particularly, the method of preparing the proton conductive copolymer represented by formula 4 will be described.

First, the copolymer represented by formula (5) including the first styrene repeating unit represented by formula (1) and the dimethylsiloxane repeating unit represented by formula (3) is mixed with a solvent. The mixture is refluxed to uniformly disperse the copolymer through the solvent. Then, sulfonation is carried out to obtain the proton conductive copolymer represented by formula 4

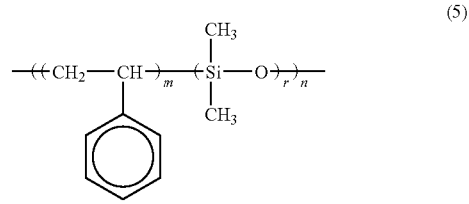

(5)

Here, m represents a mole fraction and is in the range of 0.1 to 0.9, r represents a mole fraction and is in the range of 0.1 to 0.9, wherein m+r=1 and n is in the range of 1 to 100,000.

The conditions for the sulfonation are not specifically limited. However, according to an embodiment of the present invention, the sulfonation is performed with acetyl sulfate obtained using a mixture of acetic anhydride and sulfuric acid at the temperature between 30 to 100° C. When the temperature is less than 30° C., the sulfonation may not be sufficiently performed, and when the temperature is higher than 100° C., a thermal depolymerization of the polymer may be facilitated. A uniformly sulfonated copolymer can be obtained and the degree of the sulfonation can be regulated using acetyl sulfate as a sulfonylating agent.

The amount of sulfuric acid may be 0.1 to 3 mole based on 1 mole of the first styrene repeating unit included in the copolymer. The amount of acetic anhydride may be 1 to 10 mole based on 1 mole of sulfuric acid.

As non-limiting examples, the solvent may include dichloroethane, dichloromethane or trichloroethane. The amount of the solvent may be 100 to 10000 parts by weight based on 100 parts by weight of the copolymer represented by formula (5) including the first styrene repeating unit represented by formula (1) and the dimethylsiloxane repeating unit. When the amount of the solvent is out of the range, the copolymer represented by formula 5 may not be uniformly dispersed or the reactants may be diluted to lower the reactivity of the sulfonation.

An alcohol is used to terminate the sulfonation by reacting with excess acetyl sulfate. Examples of the alcohol may include 2-propanol, methanol, ethanol, 1-butanol, or the like. The amount of the alcohol may be 1 to 10 mole based on 1 mole of the sulfuric acid.

After the sulfonation, the solvent is evaporated under decreased pressure and removed from the sulfonated result. The result is washed with a solvent such as water and methanol to obtain a desired copolymer. According to an embodiment of the present invention, a uniformly sulfonated copolymer can be obtained using acetyl sulfate as the sulfonylating agent, and the degree of sulfonation can be regulated. A polymer electrolyte membrane that contains the copolymer has excellent ion conductivity and reduced methanol crossover.

The ion conductive copolymer of an embodiment of the present invention includes the dimethylsiloxane repeating unit, which provides the copolymer with an excellent ability to form a membrane and excellent control of methanol permeability.

The ion conductivity copolymer can be used for a polymer electrolyte membrane of fuel cells. The method of manufacturing the polymer electrolyte membrane is not limited, and an example of the method is as follows.

The obtained ion conductive copolymer is dissolved in a solvent, coated on a support and dried to form a polymer electrolyte membrane. The dried polymer electrolyte membrane can be separated from the support. Non-limiting examples of the support include a glass substrate having uniform surface, a polytetrafluoroethylene membrane, a polyethyleneterephthalate (PET) plate, a metal plate, or the like.

As non-limiting examples, the solvent can be toluene, butanol, a mixture thereof and the amount of the solvent can be 50 to 10,000 parts by weight based on 100 parts by weight of the ion conductive copolymer. The polymer electrolyte membrane is dried in the air at room temperature for 1 to 24 hours, and dried in vacuum at 30 to 200° C.

The obtained polymer electrolyte membrane can be used for an electrolyte membrane of fuel cells.

The fuel cell according to an embodiment of the present invention includes a cathode, an anode and a polymer electrolyte membrane interposed between the cathode and the anode.

Each of the cathode and anode may include a gas diffusion layer and a catalyst layer. The catalyst layer may include a metal catalyst facilitating reactions such as the oxidation of hydrogen and the reduction of oxygen. Non-limiting examples of the metal catalyst include at least one catalyst of Pt, Ru, Os, a Pt—Os alloy, a Pt—Pd alloy and a Pt-M alloy wherein M is at least one transitional metal selected from the group consisting of Ga, Ti, V, Cr, Mn, Fe, Co, Ni, Cu and Zn. Among them, the metal catalyst may preferably include at least one of Pt, Ru, Os, a Pt—Ru alloy, a Pt—Os alloy, a Pt—Pd alloy, a Pt—Co alloy, and a Pt—Ni alloy.

Additionally, the metal catalyst may be supported in a support. Non-limiting examples of the support include carbon such as acetylene black and graphite or inorganic particles such as alumina, silica, etc. The noble metal catalyst supported in a support can be commercially obtainable or prepared.

As the gas diffusion layer, carbon paper or carbon cloth may be used, but is not limited thereto. The gas diffusion layer supports the electrode of fuel cells and diffuses the reaction gas throughout the catalyst layer to facilitate access of the reaction gas to the catalyst layer. Waterproof carbon paper or carbon cloth treated with a fluorine based resin such as polytetrafluoroethylene can be used for the gas diffusion layer since they may prevent decreases in the gas diffusion caused by water generated when the fuel cell operates.

To enhance the gas diffusion effect of the gas diffusion layer, a microporous layer may further be included between the gas diffusion layer and the catalyst layer in the electrode. The microporous layer can be formed by applying a composition including a conductive material such as carbon powder, carbon black, activated carbon, acetylene black, etc., a binder such as polytetrafluoroethylene and an ionomer, if necessary.

The fuel cell of an embodiment of the present invention may be a direct methanol fuel cell (DMFC).

A DMFC using the polymer electrolyte membrane according to an embodiment of the present invention will be described in detail, referring to FIG. 1.

The DMFC has a structure illustrated in FIG. 1.

As shown in FIG. 1, the DMFC includes an anode 32 to which fuel is supplied, a cathode 30 to which the oxidizing agent is supplied, and an electrolyte membrane 41 interposed between the anode 32 and the cathode 30. Typically, the anode 32 includes an anode diffusion layer 22 and an anode catalyst layer 33, and the cathode 30 includes a cathode diffusion layer 32 and a cathode catalyst layer 31.

An aqueous methanol solution supplied to the anode catalyst layer 33 through the anode diffusion layer 22 is decomposed into electrons, protons, carbon dioxide, etc. The protons migrate to the cathode catalyst layer 31 through the electrolyte membrane 41, the electrons migrate to an external circuit, and the carbon dioxide is discharged out. At the cathode catalyst layer 31, the protons that have migrated through the electrolyte membrane react with the electrons supplied from the external circuit and oxygen supplied through the cathode diffusion layer 32 to produce water.

Hereinafter, the present invention will be described in more detail with reference to examples. The following examples are for illustrative purposes and are not intended to limit the scope of the present invention.

Example 1

Preparation of Proton Conductive Block Copolymer and Polymer Electrolyte Membrane Using the Same

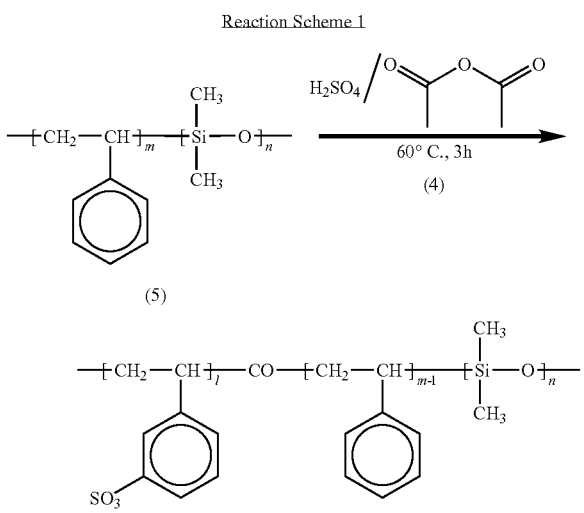

In an atmosphere of nitrogen, 2 g of the styrene-dimethylsiloxane block copolymer represented by formula 5 (m=0.7, r=0.3, n is about 170 and a weight average molecular weight is 159,000) was added to 20 g of dichloroethane and the mixture was refluxed at 50° C.

Separately, acetic anhydride and about 98% sulfuric acid were mixed in a mole ratio of 2 to 1 to prepare acetyl sulfate.

0.9 g of acetyl sulfate was added to the refluxed mixture and the resulting mixture was refluxed at 60° C. for 3 hours. Then, 2-prophanol was added to terminate the reaction, and the solvent was evaporated and removed from the reaction mixture. The result was washed with water and methanol to produce the block copolymer represented by formula 4 (Sample 1).

0.3 g of the block copolymer obtained in Example 1 was dissolved in 10 g of a mixed solvent which included toluene and butanol in a volume ratio of 7 to 3. The mixture was stirred for 12 hours.

The resulting mixture was applied to a support, then the support was dried at 70° C. for a day and dried in vacuum at 70° C. for more than 12 hours to form the polymer electrolyte membrane having a thickness of 100 μm.

Example 2

Preparation of Proton Conductive Block Copolymer and Polymer Electrolyte Membrane Using the Same A block copolymer (Sample 2) (p=0.6 (p=m−q), q=0.1, n is about 170, a weight average molecular weight is 17,300) and a polymer electrolyte membrane having a thickness of 115

µm were produced in the same manner as in Example 1 except that 3 g of acetyl sulfate was used. The degree of the sulfonation was 15%.

Example 3

Preparation of Proton Conductive Block Copolymer and Polymer Electrolyte Membrane Using the Same

A block copolymer (Sample 3) (p=0.48 (p=m−q), q=0.22, n is about 170, a weight average molecular weight is 18,900) and a polymer electrolyte membrane having a thickness of 90 µm were produced in the same manner as in Example 1 except that 4 g of acetyl sulfate was used. The degree of the sulfonation was 32%.

Example 4

Preparation of Proton Conductive Block Copolymer and Polymer Electrolyte Membrane Using the Same

A block copolymer (Sample 4) (p=0.46 (p=m−q), q=0.24, n is about 170, a weight average molecular weight is 19,200) and a polymer electrolyte membrane having a thickness of 220 µm were produced in the same manner as in Example 1 except that 6.4 g of acetyl sulfate was used. The degree of the sulfonation was 34%.

Example 5

Preparation of Proton Conductive Block Copolymer and Polymer Electrolyte Membrane Using the Same

A block copolymer (Sample 5) (p=0.43 (p=m−q), q=0.27, n is about 170, a weight average molecular weight is 19,600) and a polymer electrolyte membrane having a thickness of 120 µm were produced in the same manner as in Example 1 except that 9 g of acetyl sulfate was used. The degree of the sulfonation was 38%.

The degree of sulfonation, glass transition temperature, thickness of the polymer electrolyte membrane, methanol permeability, degree of water impregnation and ion conductivity of the proton conductive block copolymer prepared by Examples 1 to 5 were measured. The results are shown in Table 1.

The methanol permeability in Table 1 was measured at room temperature (25° C.) and the ion conductivity was measured at 30° C. using a 4-point method.

Figure 2:
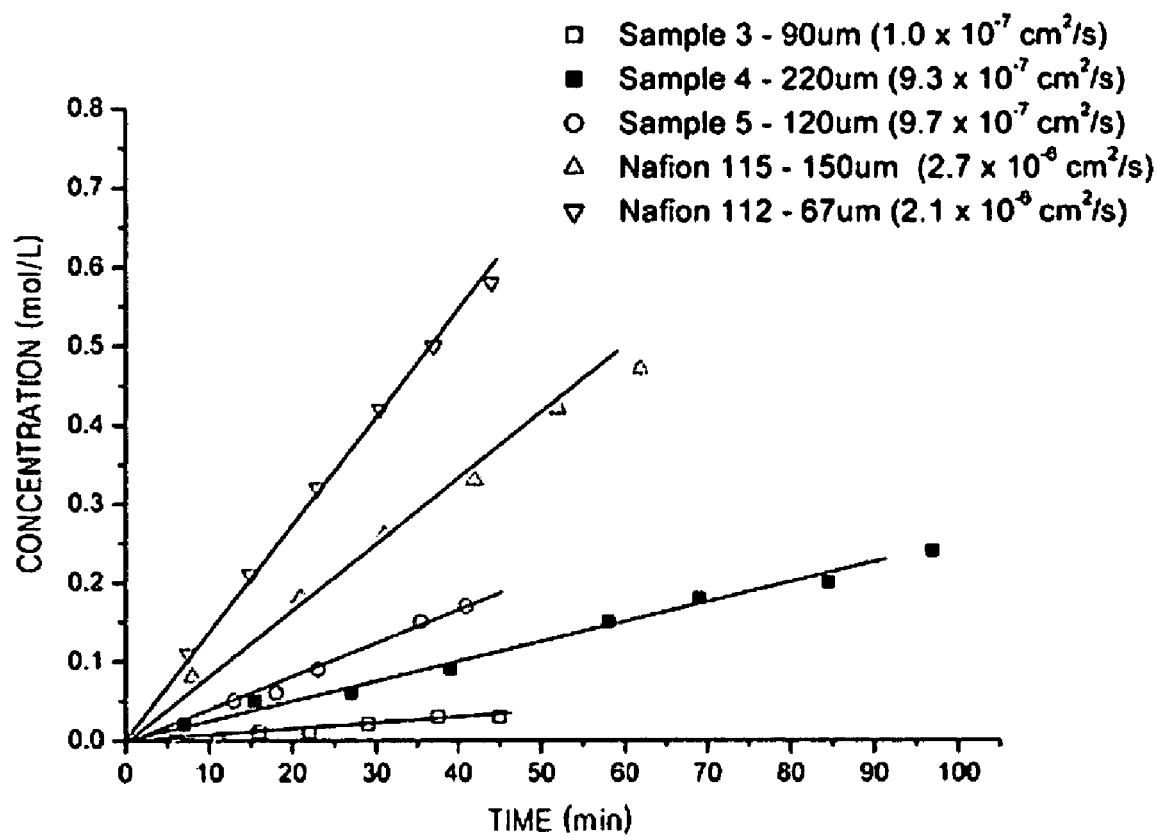
FIG. 2 is a graph illustrating the test result of methanol permeability of polymer electrolyte membranes of Samples 3 to 5 obtained according to an embodiment of the present invention, NAFION 115 and NAFION 112.

The methanol permeability of the polymer electrolyte membrane of Samples 3, 4 and 5 and NAFION 112 and 115 in Table 1 is also illustrated in FIG. 2. The methanol permeability was measured using a diffusion cell method in which 35 ml cells located both sides of the polymer electrolyte membrane were filled with water and 3 M methanol and changes in the concentrations of water and methanol were measured over time.

Figure 3:
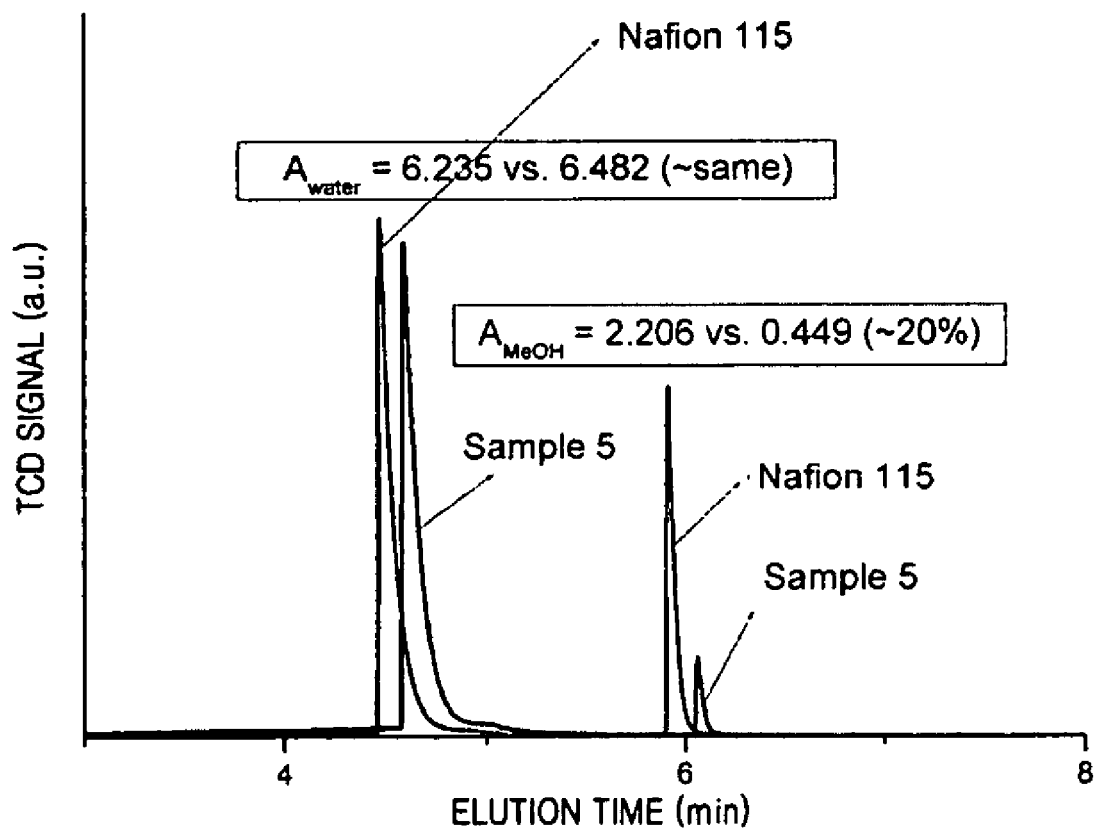
FIG. 3 is a graph illustrating the analysis result of gas chromatography of Sample 5 obtained according to an embodiment of the present invention and NAFION 115.

Sample 5 and NAFION 115 were analyzed using gas chromatography and the results are shown in FIG. 3. In the gas chromatography, 3 M of methanol flowed at a rate of 0.3 cc/min in one cell of cells located both sides of the polymer electrolyte membrane and nitrogen flowed at a rate of 0.5 L/min in the other cell. Water and methanol permeated in their equilibrium states were analyzed using gas chromatography column.

Referring to FIG. 3, the water permeability of Sample 5 is similar to that of NAFION 115 but the methanol permeability of Sample 5 is 20% of NAFION 115.

Example 6

Manufacturing Unit Cell of Fuel Cell

A unit cell was produced using Sample 4 as a polymer electrolyte membrane. An electrode on which 10 mg/cm$^2$ of PtRu was loaded was used as a cathode and an electrode on which 10 mg/cm$^2$ of PtRu was loaded was used as an anode.

A fuel cell was produced using the electrodes and the polymer electrolyte membrane.

Example 7

Manufacturing Unit Cell of Fuel Cell

A fuel cell was produced in the same manner as Example 6, except that a polymer electrolyte membrane using Sample 5 was used instead of the polymer electrolyte membrane using Sample 4.

TABLE 1

| | Thickness of polymer electrolyte membrane (µm) | Degree of sulfonation** (amount of sulfuric acid) | Glass transition temperature (Tg) (° C.) | Degree of water impregnation*** (%) | Methanol permeability (cm$^2$/s) | Ion conductivity (S/cm) |
|---|---|---|---|---|---|---|
| Standard Sample* | | 0%(0 mole) | 109 | | N.A. | N.A. |
| Sample 1 | 100 | N.A.(0.25 mole) | — | 17 | N.A. | N.A. |
| Sample 2 | 115 | 15%(0.80 mole) | — | 22 | N.A. | N.A. |
| Sample 3 | 90 | 32%(1.1 mole) | 130 | 26 | $1.0 \times 10^{-7}$ | 0.003 |
| Sample 4 | 220 | 34%(1.5 mole) | — | 54 | $9.3 \times 10^{-7}$ | 0.07 |
| Sample 5 | 120 | 38%(2 mole) | 169 | 70 | $9.7 \times 10^{-7}$ | 0.08 |
| NAFION 112 | 67 | | — | 27 | $2.1 \times 10^{-6}$ | 0.09 |
| NAFION 115 | 150 | | — | 31 | $2.7 \times 10^{-6}$ | 0.09 |

*Standard Sample refers to 0.1 g of the styrene-dimethylsiloxane block copolymer represented by formula 5 (p = 0.7, q = 0.3, and a weight average molecular weight is 159,000).
**Degree of sulfonation refers to a weight percentage of the total amount of styrene which includes styrene and sulfonated styrene to the sulfonated styrene, and was measured using the two dimensional NMR (HMQC).
***Degree of water impregnation is (Mass$_{wet}$−Mass$_{dry}$)/Mass$_{dry}$. Mass$_{wet}$ refers to the weight of impregnated electrolyte membrane after 24 hour impregnation and Mass$_{dry}$ refers to the weight of the dried electrolyte membrane.

Comparative Example 1

A fuel cell was produced in the same manner as Example 6, except that NAFION 112 was used instead of the polymer electrolyte membrane using Sample 4.

Comparative Example 2

A fuel cell was produced in the same manner as Example 6, except that NAFION 115 was used instead of the polymer electrolyte membrane using Sample 4.

Voltage changes depending on the current density of fuel cells produced in Examples 6 and 7 and Comparative Examples 1 and 2 were measured. The results are shown in FIG. 4.

Figure 4:
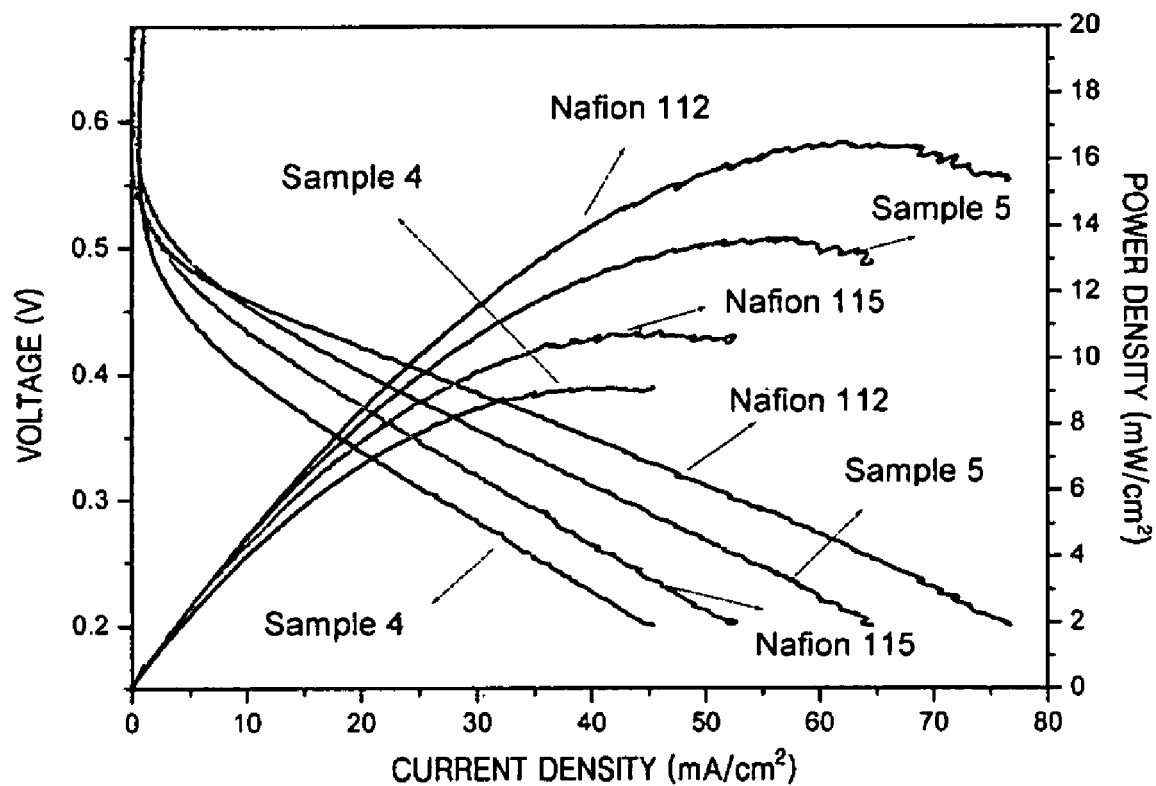
FIG. 4 is a graph illustrating voltage changes depending on the current density of fuel cells using polymer electrolyte membranes of Samples 4 to 5 obtained according to an embodiment of the present invention and using NAFION 112 and NAFION 115.

Referring to FIG. 4, the initial efficiency of unit cells of DMFC using Samples 4 and 5 is similar to that of NAFION 112 and 115.

Power density of fuel cells produced in Examples 6 and 7 and Comparative Examples 1 and 2 were measured. The results are shown in FIG. 5.

Figure 5:
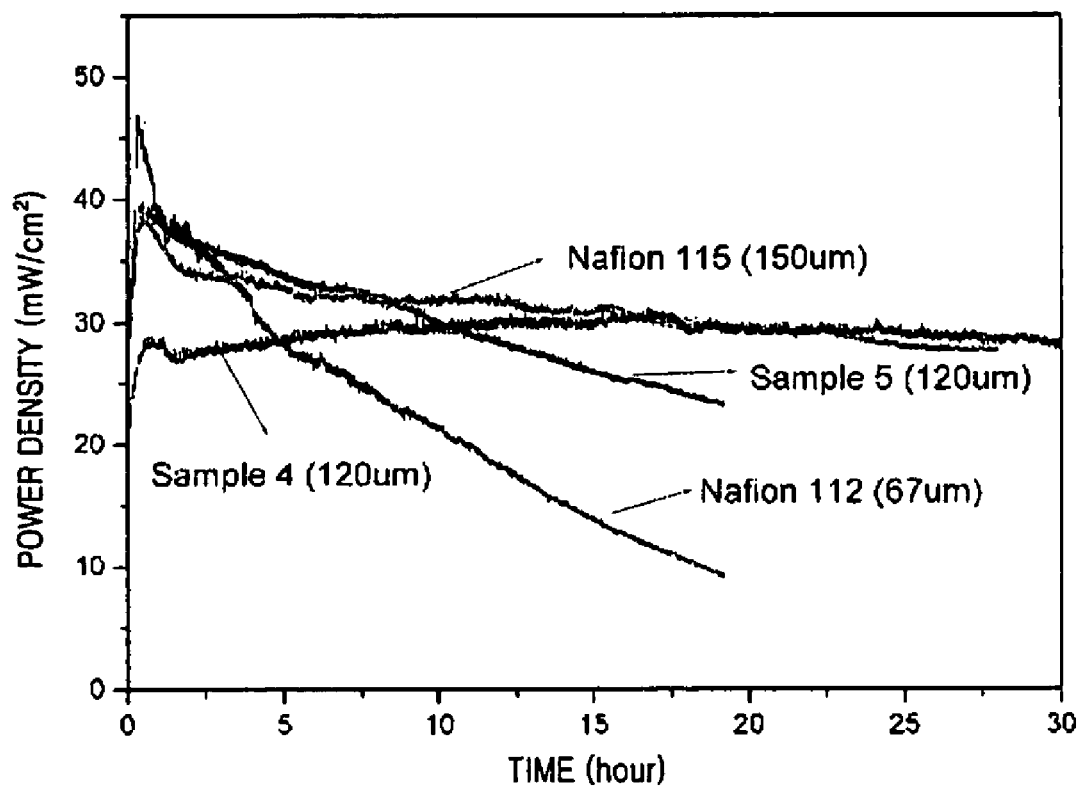
FIG. 5 is a graph illustrating power density changes over time of fuel cells using polymer electrolyte membranes of Samples 4 to 5 obtained according to an embodiment of the present invention and using NAFION 112 and NAFION 115.

Referring to FIG. 5, when the DMFC continuously operates, the efficiency of unit cells using Samples 4 and 5 decreases less than those using NAFION membranes since the methanol permeability of Samples 4 and 5 is lower than that of NAFION membranes.

The proton conductive copolymer according to aspects of the present invention has excellent chemical and mechanical properties, excellent ability to form a membrane with dimethylsiloxane repeating units, lower methanol permeability and superior ion conductivity with styrene repeating units that have proton conductive functional groups. Polymer electrolyte membranes that have properties appropriate for the fuel cell electrolyte membrane can be obtained using the proton conductive copolymer. Fuel cells that have improved efficiencies can be obtained using the polymer electrolyte membrane.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A polymer electrolyte membrane comprising a proton conductive copolymer comprising repeating units represented by formula (4) below:

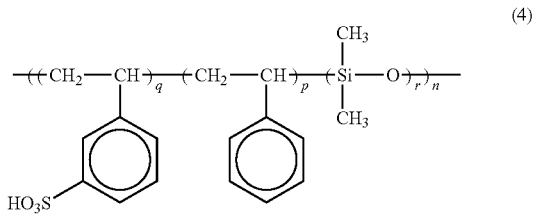

(4)

where p, q and r each represent a mole fraction, p, q and r are each in the range of 0.1 to 0.9, n is 1 to 100,000 and p+q+r=1.

2. The polymer electrolyte membrane of claim 1, wherein the degree of polymerization of the proton conductive copolymer with respect to each of the repeating units indicated by the mole fractions p, q and r of the proton conductive copolymer is 1 to 100,000.

3. The polymer electrolyte membrane of claim 1, wherein a weight average molecular weight of the proton conductive copolymer is 500 to 5,000,000.

4. The polymer electrolyte membrane of claim 1, wherein the proton conductive copolymer is prepared by combining a copolymer represented by formula (5):

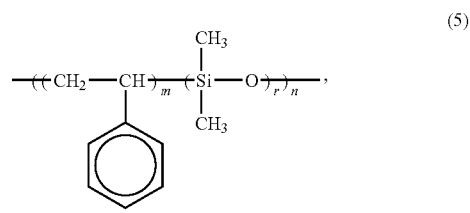

(5)

wherein m represents a mole fraction and is in the range of 0.1 to 0.9 mole, r represents a mole fraction and is in the range of 0.1 to 0.9 mole, wherein m+r=1 and n is in the range of 1 to 100,000 with a solvent; and sulfonating the copolymer represented by formula (5).

5. The polymer electrolyte membrane of claim 4, wherein the sulfonating is carried out by treating the copolymer represented by formula (5) with a mixture of acetic anhydride and sulfuric acid.

6. The polymer electrolyte membrane of claim 5, wherein the sulfonating is carried out at the temperature between 30 to 100° C.

7. The polymer electrolyte membrane of claim 5, wherein the amount of sulfuric acid in the mixture of acetic anhydride and sulfuric acid is 0.1 to 3 moles based on 1 mole of a styrene repeating unit in the copolymer represented by formula (5) and wherein the amount of acetic anhydride is 1 to 10 moles based on 1 mole of sulfuric acid.

8. The polymer electrolyte membrane of claim 4, wherein the solvent is dichloroethane, dichloromethane or trichloroethane.

9. The polymer electrolyte membrane of claim 4, wherein the amount of the solvent is 100 to 10000 parts by weight based on 100 parts by weight of the copolymer represented by formula (5).

10. The polymer electrolyte membrane of claim 4, wherein a degree of the sulfonating is controlled by controlling a molar amount of sulfuric acid relative to a molar amount of styrene repeating units in the copolymer represented by formula 5 and by terminating the sulfonating with an alcohol.

11. The polymer electrolyte membrane of claim 10, wherein the alcohol is 2-propanol, methanol, ethanol, or 1-butanol.

12. The polymer electrolyte membrane of claim 1, wherein the polymer electrolyte membrane is a polymer electrolyte membrane of a direct methanol fuel cell.

13. A polymer electrolyte membrane formed by dissolving a proton conductive polymer in toluene or butanol, or a mixture thereof, coating the dissolved proton conductive polymer onto a support and drying the coated dissolved proton conductive polymer to form the polymer electrolyte membrane, wherein the proton conductive polymer is prepared by combining a copolymer represented by formula (5):

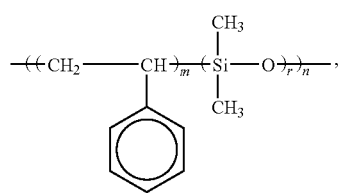

(5)

wherein m represents a mole fraction and is in the range of 0.1 to 0.9 mole, r represents a mole fraction and is in the range of 0.1 to 0.9 mole, wherein m+r=1 and n is in the range of 1 to 100,000 with a solvent; and sulfonating the copolymer represented by formula (5).

14. A fuel cell comprising the polymer electrolyte membrane of claim 1.

15. A fuel cell comprising:
a cathode;
an anode; and
the polymer membrane of claim 1 interposed between the cathode and the anode.

16. The fuel cell of claim 14, wherein the fuel cell is a direct methanol fuel cell.

17. The polymer electrolyte membrane of claim 1, wherein p is in the range of 0.43 to 0.6, q is in the range of 0.1 to 0.27 and r is 0.3.

18. A proton conductive copolymer comprising repeating units represented by formula (4) below:

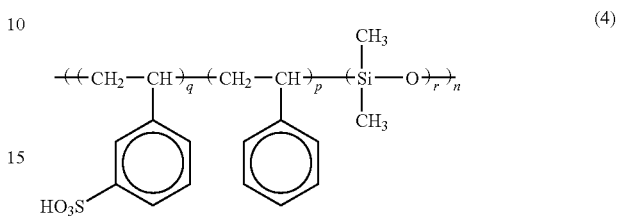

(4)

where p, q and r each represent a mole fraction, p is in the range of 0.43 to 0.6, q is in the range of 0.1 to 0.27 and r is 0.3, n is 1 to 100,000 and p+q+r=1.

\* \* \* \* \*